United States Patent [19]

Dennis et al.

[11] Patent Number: 5,539,560

[45] Date of Patent: Jul. 23, 1996

[54] OPTICAL ROUTER WITH OPTICAL CONTROL

[75] Inventors: Ann W. Dennis, Aloha; Jerome J. Giza, Hillsboro; Donald H. Kozicki, Portland; John D. Liebenrood, Portland; Casey S. Shaar, Portland, all of Oreg.

[73] Assignee: Photon Kinetics, Inc., Beaverton, Oreg.

[21] Appl. No.: 349,315

[22] Filed: Dec. 5, 1994

[51] Int. Cl.$^6$ .................................................. H04J 14/02
[52] U.S. Cl. ........................ 359/128; 359/115; 359/152; 359/110; 385/124
[58] Field of Search ................................. 359/110, 115, 359/152, 173, 128, 127, 117; 356/73.1; 385/124

[56] References Cited

U.S. PATENT DOCUMENTS 5,383,015  1/1995  Grimes et al. .......................... 359/110

5,432,627  7/1995  Nishio .................................... 359/128

*Primary Examiner*—Leo Boudreau
*Assistant Examiner*—Kinfe-Michael Negash
*Attorney, Agent, or Firm*—Smith-Hill and Bedell

[57] ABSTRACT

An optical multiplexer comprises a signal energy divider, such as a directional coupler, for dividing optical signal energy received by way of a multiplexer upstream port into a control portion and a utilization portion, and an optical switch having a first switch port connected to receive the utilization portion of the optical signal energy and having a plurality of additional switch ports connected to repsecive multiplexer downstream ports. A decoder extracts a control message from the control portion of the optical signal energy, and a controller is responsive to the control message for selectively setting the switch to interconnect the first switch port and a selected one of the additional switch ports. In this manner, at least part of the utilization portion of the optical signal energy received by the multiplexer by way of the multiplexer upstream port is emitted from the multiplexer by way of the multiplexer downstream port that is connected to the selected one of the additional switch ports.

32 Claims, 3 Drawing Sheets

OPTICAL ROUTER WITH OPTICAL CONTROL

BACKGROUND OF THE INVENTION

This invention relates to an optical router with optical control.

In a telephone switching office, it is conventional to observe the condition of an optical fiber line used for telephone communication by use of a test instrument that includes an optical time domain reflectometer (OTDR) unit. As is well known, the OTDR unit has an optical I/O port that is optically coupled to the fiber line under test, and the OTDR unit launches pulses of optical energy into the line under test and measures the intensity with which optical energy is returned by way of the I/O port. In order to allow a single OTDR unit to observe multiple optical fiber lines, an optical router is interposed between the optical I/O port on the OTDR and the optical fiber lines. The router has an upstream port that is coupled to the optical I/O port of the OTDR unit and has multiple downstream ports and includes an optical switch for optically coupling its upstream port with any selected downstream port. The OTDR unit is electrically connected to the router for supplying commands to the router for controlling the state of the switch. The router responds to a command by causing the switch to connect the upstream port of the router to a selected downstream port.

The OTDR unit of the test instrument is controlled from an automated/manual control system that provides electrical control signals to the OTDR unit and receives electrical response messages from the OTDR unit.

In order to allow the OTDR unit to observe more optical fiber lines than the router has downstream ports, one or more of the downstream ports of the router may be connected to the upstream port of a second level router having downstream ports connected to respective optical fiber lines. The electrical control signals for controlling operation of the second level router are supplied by the operator interface, which receives response messages from the second level switch.

It will be seen that by adding routers in a star or cascade arrangement, a single OTDR unit can be used to observe a large number of optical fiber lines.

A disadvantage of the arrangement described above is that it is necessary to provide electrical connections not only between the operator interface and the OTDR unit, but also between the operator interface and each router (other than the highest level router). This is inconvenient because the routers that are lower in the hierarchy might be at a considerable distance from the OTDR unit.

SUMMARY OF THE INVENTION

In accordance with a first aspect of the present invention there is provided a router having at least one router upstream port for receiving optical signal energy and a plurality of router downstream ports for emitting optical signal energy, said router comprising a signal energy division means for dividing the optical signal energy received by way of the router upstream port into a control portion and a utilization portion, an optical switch having a first switch port connected to receive the utilization portion of the optical signal energy and having a plurality of additional switch ports connected to the router downstream ports respectively, a decoder means for extracting a control message from the control portion of the optical signal energy, and a control means responsive to the control message for selectively setting the switch to interconnect the first switch port and a selected one of the additional switch ports, whereby at least part of the utilization portion of the optical signal energy received by the router by way of the router upstream port is emitted from the router by way of the router downstream port that is connected to the selected one of the additional switch ports.

In accordance with a second aspect of the present invention there is provided a router having at least one router upstream port for receiving optical signal energy and a plurality of router downstream ports for emitting optical signal energy, said router comprising a signal energy division means for dividing the optical signal energy received by way of the router upstream port into a control portion and a utilization portion, an optical switch having a first switch port connected to receive the utilization portion of the optical signal energy and having a plurality of additional switch ports connected to the router downstream ports respectively, and an optical transceiver having an I/O port connected to the signal energy division means for receiving the control portion of the optical signal energy, the optical transceiver comprising a receiver responsive to the control portion of the optical signal energy for generating a control message, a control means responsive to the control message for selectively setting the switch to interconnect the first switch port and a selected one of the additional switch ports, whereby at least part of the utilization portion of the optical signal energy received by the router by way of the router upstream port is emitted from the router by way of the router downstream port that is connected to the selected one of the additional switch ports, and a transmitter responsive to a message generated by the control means for emitting optical energy by way of the I/O port.

In accordance with a third aspect of the present invention there is provided a router having at least one router upstream port for receiving optical signal energy and a plurality of router downstream ports for emitting optical signal energy, said router comprising an optical directional coupler having a first port connected to the router upstream port and also having second, third, and fourth ports, the optical directional coupler dividing the optical signal energy received by way of the router upstream port into a utilization portion that is emitted by way of the second port and a control portion that is emitted by way of the third port, an optical switch having a first switch port connected to the second port of the directional coupler for receiving the utilization portion of the optical signal energy and having a plurality of additional switch ports connected to the router downstream ports respectively, a first optical transceiver having an I/O port connected to the third port of the optical directional coupler for receiving the control portion of the optical signal energy, the first optical transceiver comprising a receiver responsive to the control portion of the optical signal energy for generating a control message, a control means responsive to the control message for selectively setting the switch to interconnect the first switch port and a selected one of the additional switch ports, and a transmitter responsive to a message generated by the control means for emitting optical energy by way of the I/O port, and a second optical transceiver having an I/O port connected to the fourth port of the optical directional coupler for receiving optical energy from, and transmitting optical energy to, the selected one of the additional switch ports of the switch.

In accordance with a fourth aspect of the present invention there is provided test apparatus for stimulus/response testing of a plurality of devices, comprising a stimulus/response means for emitting signal energy in a predetermined form at an I/O port and receiving return energy in said predetermined form at the I/O port, said signal energy having a test signal component and a control signal component, and a router means having a router upstream port connected to the I/O port of the stimulus/response means for receiving signal energy in said predetermined form and also having a plurality of router downstream ports for connection to respective devices under test, said router means comprising a switch means having a first switch port connected to receive at least a portion of the test signal component of the signal energy received at the router upstream port and having additional switch ports connected to the router downstream ports respectively, a control signal decoding means responsive to the control signal component of the signal energy received at the router upstream port for extracting a control message, and a control means responsive to the control message for selectively setting the switch means to interconnect the first switch port and a selected one of the additional switch ports, whereby at least a portion of the test signal component of the signal energy received by the router means by way of the router upstream port is emitted from the router means by way of the router downstream port that is connected to the selected one of the additional switch ports.

BRIEF DESCRIPTION OF THE DRAWINGS

For a better understanding of the invention, and to show how the same can be carried into effect, reference will now be made, by way of example, to the accompanying drawings in which.

DETAILED DESCRIPTION

Figure 1:
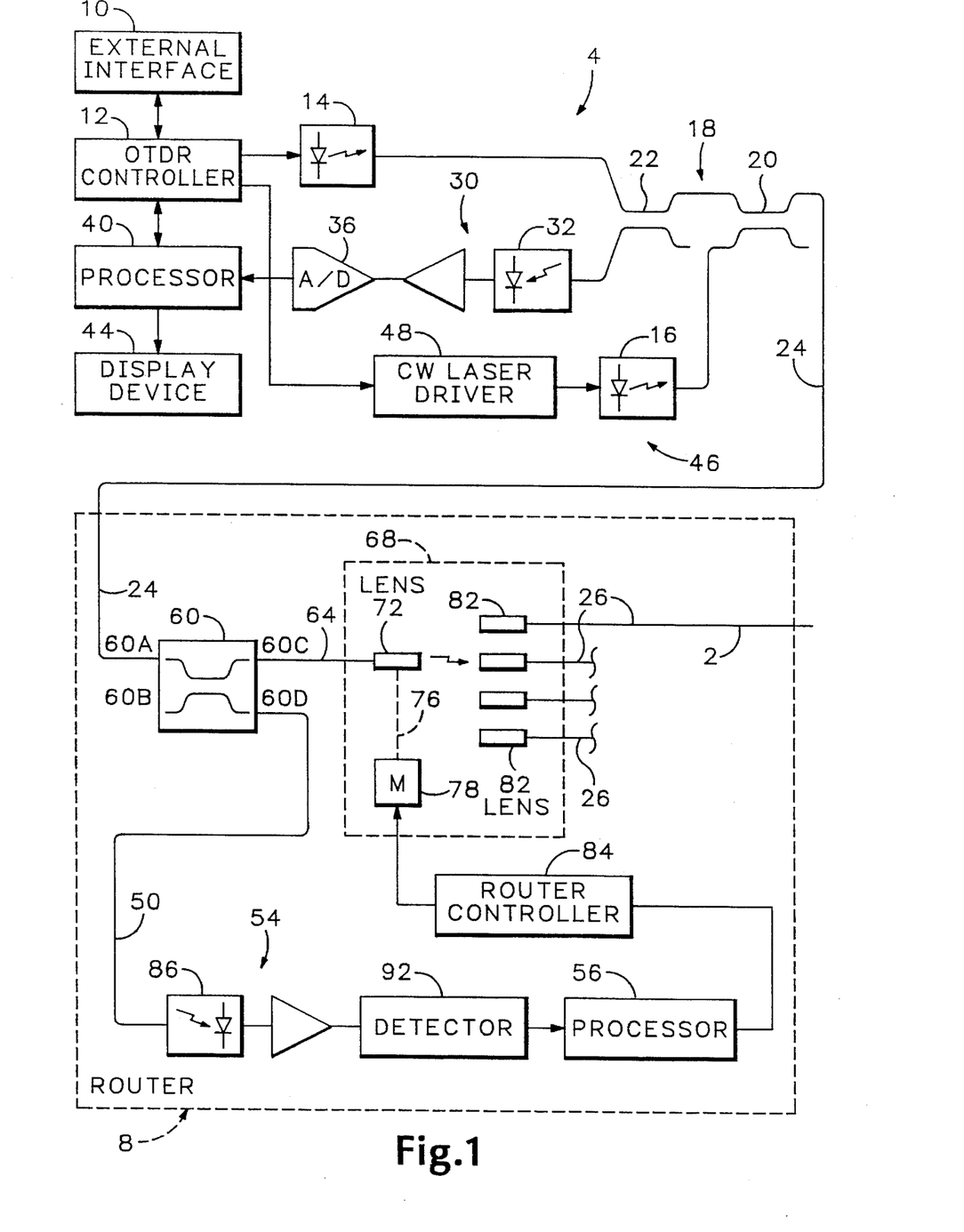
FIG. 1 is block diagram of a first apparatus for stimulus/response testing of multiple optical fiber lines.

The apparatus shown in FIG. 1 is used for stimulus/response testing of multiple optical fiber lines 2 and comprises an OTDR unit 4, an optical router 8, and an external interface unit 10. The lines 2 are so-called dark lines that are not currently in use for telephone communication.

The OTDR unit 4 comprises an OTDR controller 12, by which the OTDR unit communicates with the external interface unit 10, and two laser diodes 14 and 16. The laser diodes are optically coupled through a path 18, which includes directional couplers 20 and 22, to an optical fiber 24. The fiber 24 is connected to the upstream (relative to the direction of propagation of light from the OTDR unit 4) port of the router 8 and is a stem fiber with respect to the router. The router has multiple downstream ports connected through branch fibers 26 to the lines 2 respectively. The operation of the router will be described in detail below. At this point, however, it is sufficient to note that the router allows the stem fiber 24 to be coupled to any selected one of the branch fibers 26, and hence to any one of the optical fiber lines 2.

The apparatus has two principal modes of operation, namely a test mode and a control mode. The laser diode 14 is used in the test mode, whereas the laser diode 16 is used in the control mode.

In the test mode, current pulses are supplied to the laser diode 14 in known fashion under control of the OTDR controller 12 and cause the laser diode 14 to emit brief pulses of light at, for example, 1310 nm. The intensity of the light pulses remains essentially constant, but the interval between pulses varies under control of the controller 12. The light pulses pass through the path 18 to the stem fiber 24 and are coupled by the router 8 and the selected branch fiber 26 to one of the optical fiber lines 2. Optical energy that is reflected and backscattered within the selected optical fiber line 2 is coupled through the router 8, the fiber 24, and the directional coupler 22 to a receiver 30. The receiver 30 comprises a photodiode 32, which generates a current signal depending on the power with which return optical energy is coupled from the fiber 26 into the fiber 24. The current signal provided by the photodiode 32 is amplified and is converted to a voltage signal, and the voltage signal is converted to digital form by an analog-to-digital converter 36. The digital signal provided by the A/D converter 36 undergoes digital signal processing, such as averaging for noise reduction, by a processor 40. A display device 44, e.g. a cathode ray tube, is addressed using the digital values provided by the processor and provides a display of the level of return power as a function of distance along the selected optical fiber line 2.

The laser diode 16 is a continuous wave laser diode and is part of a control signal transmitter 46, which also includes a continuous wave laser driver 48. In the control mode, the laser diode 16 receives drive current $I_d$ from the laser driver 48. The drive current $I_d$ is always positive and so the laser diode 16 continuously emits light. The intensity of the light emitted by the laser diode 16 varies in accordance with a carrier signal provided by the laser driver 48, and the carrier signal is modulated in response to commands provided by the OTDR controller 12. In a practical implementation of the invention, the carrier signal is a pulse signal that is modulated by phase shift keying but it will be appreciated that other modulation schemes could be used instead. The light emitted by the laser diode 16 is coupled through the coupler 20 and the stem fiber 24 to the router 8.

The router 8 comprises a directional coupler 60 having four ports 60A–60D. Optical power that is received at port 60A or 60B is emitted at ports 60C and 60D, with the port 60C emitting power at a substantially higher level than the port 60D, whereas optical power that is received at port 60C or 60D is emitted at ports 60A and 60B, with the port 60A emitting power at a substantially higher level than the port 60B. The ratio at which power is divided between the ports 60A and 60B, or 60C and 60D, is preferably at least 20:1.

The stem fiber 24 is connected to the port 60A of the directional coupler 60. In the case of the router shown in FIG. 1, the port 60B of the directional coupler 60 is unused and is terminated so that optical energy leaving the directional coupler 60 by way of the port 60B is not reflected back into the coupler. The port 60C of the directional coupler 60 is connected through a fiber 64 to a mechanically controlled optical space switch 68, and the port 60D is connected through a fiber 50 to a receiver 54.

The optical space switch 68 is of known type and comprises a common graded index (GRIN) lens 72 that is pigtailed to the fiber 64 and is mounted on a rotary arm 76. The axis of rotation of the arm 76 is parallel to, but spaced from, the optical axis of the GRIN lens 72. The arm 76 is driven to rotate by a stepper motor 78, which operates in response to pulses received from a router controller 84, so that the arm can be brought to any one of several hundred angular positions that are equiangularly spaced about the axis of rotation of the arm. In this manner, the lens 72 can be brought to any one of several hundred index positions.

The switch 68 also comprises an array of GRIN lenses 82 that are pigtailed to the branch fibers 26 respectively. The number of GRIN lenses 82 is less than the number of index positions to which the lens 72 can be brought by the stepper motor 78. The lenses 82 are disposed with their optical axes parallel to the axis of rotation of the arm 76, and their optical axes are spaced from the axis of rotation of the arm on the same radius as the optical axis of the lens 72. The lenses 82 are angularly spaced about the axis of rotation of the arm at integer multiples of the angular spacing between the index positions of the lens 72, so that for each of the lenses 82, there is one index position of the lens 72 in which the lens 72 is in coaxially aligned confronting relationship with the lens 82. In this manner, the fiber 64 can be coupled to any one of the branch fibers 26. Since the number of GRIN lenses 82 is less than the number of index positions, there is one index position in which the lens 72 is not aligned with any of the lenses 82. This index position is referred to as the home position.

The receiver 54 comprises a photodiode 86 and a detector 92. The nature of the detector depends on the type of modulation employed to modulate the intensity of light emitted by the laser diode 16. In the case of phase shift keying, the detector might comprise a rising edge detector that provides a high TTL level when its input signal level exceeds a threshold and otherwise provides a low TTL level, and a data extraction circuit that examines the output signal of the rising edge detector and provides a digital output signal that reflects the timing of the rising edges relative to clock edges. The output signal of the receiver 54 is applied to a digital signal processor 56, whose output signal is provided to the router controller 84. The digital signal processor 56 processes the output signal of the receiver 54 employing digital signal processing algorithms in order to extract valid data.

In operation of the apparatus in the control mode, the OTDR controller 12 generates a serial digital signal (a sequence of logical 1's and 0's) that represents a command. The serial digital signal is applied to the CW laser driver 48, which responds by modulating the carrier component of the optical signal in a manner that reflects the sequence of 1's and 0's. The laser diode 16 emits an optical control signal of which the intensity varies as a function of time in a similar manner. This optical signal is coupled into the stem fiber 24. A part of the control signal energy is coupled to the receiver 54, which provides a raw digital output signal. The raw digital signal is applied to the signal processor 56, which provides as output a processed digital signal that corresponds to the serial digital signal provided to the CW laser driver 48 by the OTDR controller 12.

The processed serial digital signal provided by the signal processor 56 is applied to the router controller 84. In this manner, the command represented by the serial digital signal that was generated by the OTDR controller is communicated to the router controller. The command might be, for example, GO HOME, in response to which the router controller causes the stepper motor 78 to shift to the home position.

By counting pulses provided to the stepper motor, the router controller 84 keeps track of the current index position of the switch 68, and if the switch is not at the home position, the router controller does not respond to any command received at the receiver 54 other than GO HOME, whereas if the switch is at the home position, the router controller will accept other commands. For example, if the test to be conducted by the OTDR unit involves examining each of the fiber lines 2 in turn, an initial GO HOME command is provided to the router controller, whereafter the router controller is provided with the necessary commands for implementing the required sequential examination of all the fiber lines. Depending on the nature of the test, the command might invoke a routine that is stored locally in memory associated with the router controller, whereby the router controller causes the switch to select each of the fiber lines in turn for a predetermined time, sufficient to enable the OTDR unit 4 to examine the selected fiber line, or it may select one fiber line for sufficient time to examine that line and await a further sequence of commands, prefaced by the command GO HOME, before selecting another fiber line.

When the apparatus is operating in the test mode, the OTDR unit 4 emits pulses into the fiber 24 and most of the energy of the pulses received at the port 60A of the coupler 60 is coupled into the fiber 64. Nevertheless, a small proportion of the energy is coupled into the fiber 50 and is received by the receiver 54. Because the pulses provided by the diode 14 are of constant magnitude and varying spacing whereas the optical control signal provided by the diode 16 is continuous and includes a carrier component, the signal processor 56 is able to discriminate between the optical signals provided by the diodes 14 and 16 and will not erroneously interpret test signal energy as a control signal.

The apparatus described with reference to FIG. 1 is subject to the limitation that it does not provide for messages to be communicated to the OTDR unit 4. This disadvantage is avoided in the apparatus shown in FIG. 2, in which the port 60D of the coupler 60 is not connected directly to the receiver 54. The fiber 50 that connects the port 60D of the directional coupler 60 to the receiver 54 is in two segments 50a and 50b. The segment 50a connects the directional coupler 60 to one port 88A of a directional coupler 88, and the segment 50b connects the port 88C of the coupler 88 to the receiver 54. The port 88B of the directional coupler 88 is unused. A transmitter 90, similar to the transmitter 46 shown in FIG. 1, is connected to the port 88D by a fiber 94. The OTDR unit 4 includes a receiver 104, which is similar to the receiver 54 of the router and is coupled to the optical path between the transmitter 46 and the coupler 20 by a directional coupler 106. The router controller 84 generates a serial digital signal representative of a message that is to be communicated to the OTDR unit, and this serial digital signal is applied to the transmitter 90, which emits an optical control signal of which the amplitude of the carrier component varies as a function of time in a manner that reflects the serial digital signal provided by the router controller. The optical control signal is coupled through the fiber segment 50a, the directional coupler 60, the fiber 24, and the directional couplers 20 and 106 to the receiver 104 of the OTDR unit. The processor 40 extracts the message generated by the router controller and provides it to the OTDR controller. In this manner, the router controller is able to transmit messages to the OTDR unit. For example, if the command provided by the OTDR is GO HOME, the router controller provides the status message HOME to the OTDR unit when the switch is at the home position, and the OTDR unit then provides its next command to the router.

Figure 2:
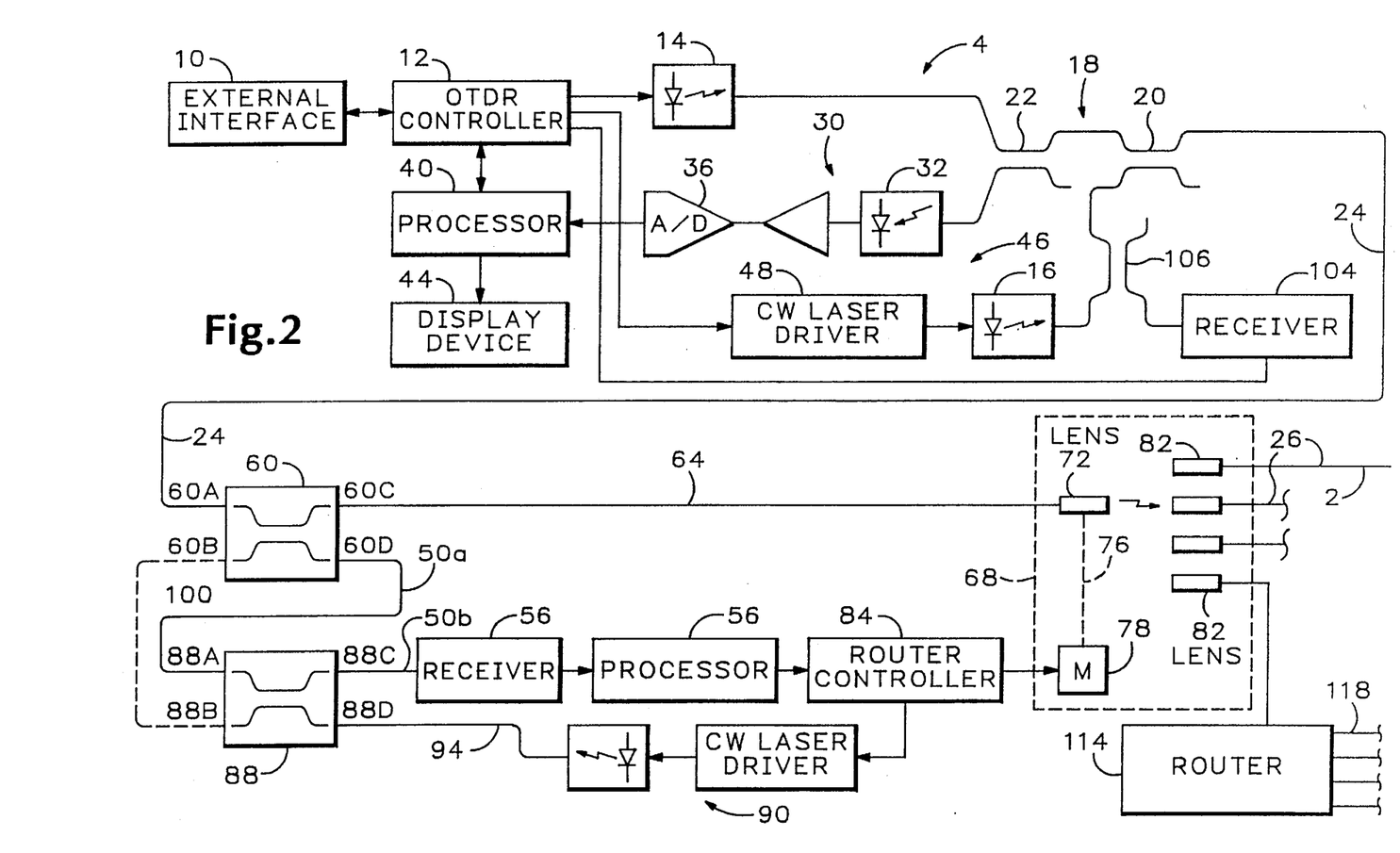
FIG. 2 is a block diagram of a second apparatus for stimulus/response testing of multiple optical fiber lines, and illustrates a modification of the second apparatus.

In a further modification, shown by a dashed line in FIG. 2, the ports 60B and 88B of the directional couplers 60 and 88 are not terminated but are connected through a fiber 100. The transmitter 90 and receiver 54 allow the router controller 84 to transmit commands to, and receive messages from, other routers that are connected to the branch fibers 26, as shown by the router 114 connected to further branch fibers 118. Each router then receives commands from, and provides response messages to, the upstream router/OTDR unit, and provides commands to, and receives response messages from, downstream router(s).

It is, of course, necessary that the controller 84 should not erroneously interpret a reflection or backscattering of its own command message, transmitted by the transmitter 90, as a response message received from a downstream router. This may be accomplished by employing suitable algorithms for digitally processing the output signal provided by the receiver 54, whereby the processor 56 is able to discriminate between its own command and a response from a downstream router and will not provide a signal to the controller 84 in response to a command. Moreover, where there are multiple levels of downstream routers, a response signal from a third or lower level router will be coupled not only to the next higher level router but also to the second higher level router. In order to guard against misinterpretation of a response, the response may include an identification field specifying the level of the router from which it originated. The feature described above, whereby if the switch 68 is not at the home position, the router controller 84 will not respond to any command other than GO HOME, ensures that the router 8 will not couple a command from the OTDR unit to a second or lower level router.

Figure 3:
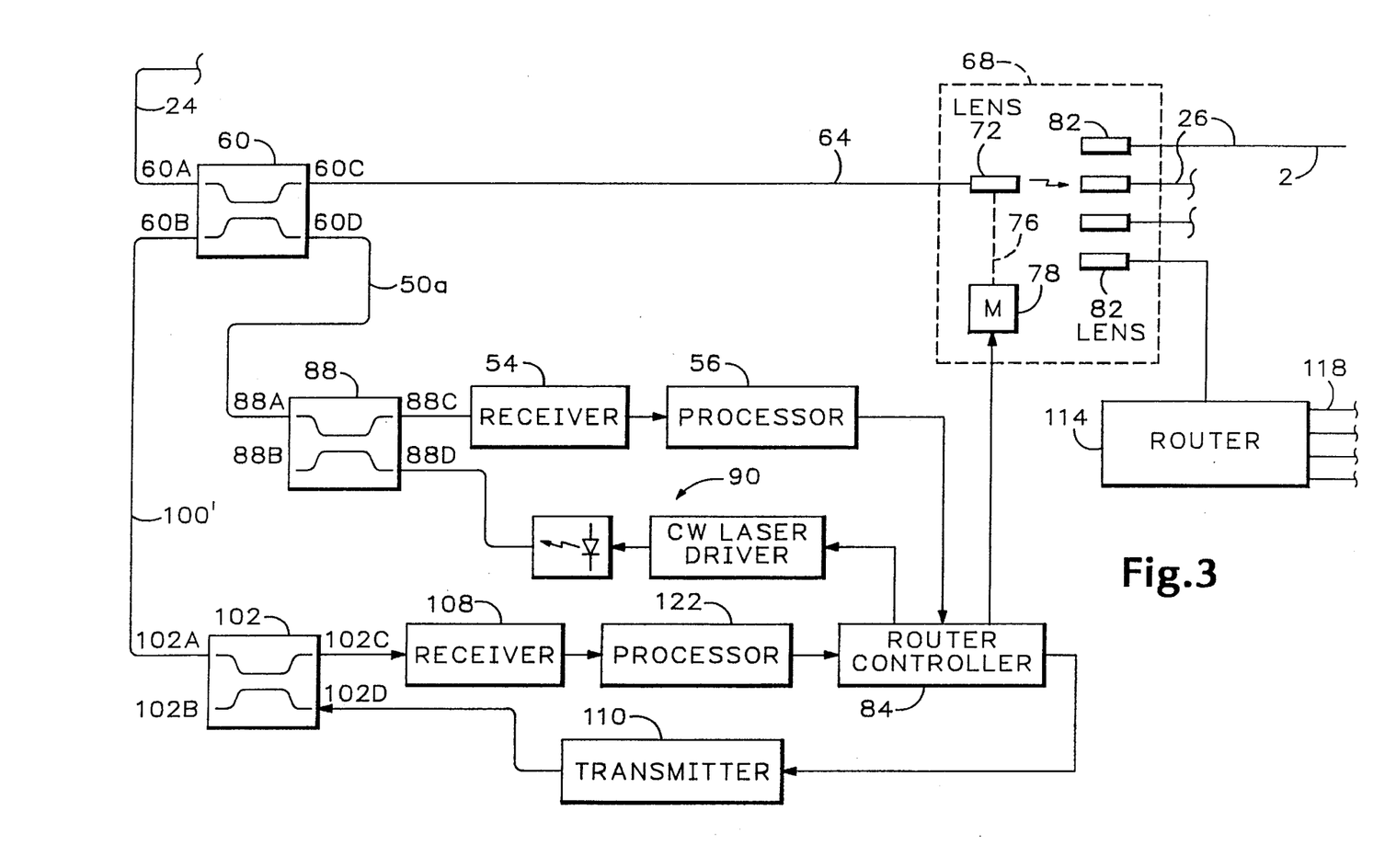
FIG. 3 is block diagram of a third apparatus for stimulus/response testing of multiple optical fiber lines.

As shown in FIG. 3, the function of the connection that is provided in FIG. 2 by the fiber 100 can be provided by using a directional coupler 102 having one port 102A connected by a fiber 100' to the port 60B of the coupler 60 and a second transceiver, comprising a receiver 108 connected to the port 102C and a transmitter 110 connected to the port 102D. The receiver 108 and transmitter 110 are similar to the receiver 54 and transmitter 90. The processor 122 that is shown in FIG. 3 may, of course, be integrated with the processor 56.

In the routers illustrated in FIGS. 1–3, the directional coupler 60 acts as an amplitude divider. Alternatively, the directional coupler 60 may be implemented by a wavelength division router, which routes an optical signal received at the port 60A either to the port 60C or to the port 60D, depending upon its wavelength. Thus, for example, if the CW laser 16 in the OTDR unit operates at 1310 nm and the pulsed laser 14 operates at 1550 nm, and the wavelength division router is a 1310/1550 device, energy at 1310 nm (carrying commands) is delivered to the receiver 54, whereas test signal energy at 1550 nm is coupled into the fiber 64. Conversely, and particularly with reference to the modification of FIG. 2 and to FIG. 3, energy received by the wavelength division router over the fiber 64 at 1550 nm is output by way of the port 60A whereas energy at 1310 nm is output by way of the port 60B. Energy received at the port 60B or 60D, which originates with the transmitter 90 or 110 and is therefore at 1310 nm, is output at the port 60C or 60A.

The routers described with reference to FIGS. 1–3 do not significantly impair the ability of the OTDR unit to conduct a test of an optical fiber line, because only a small proportion of the optical energy supplied by the OTDR unit for testing the optical fiber line is lost by way of the ports 60B and 60D of the coupler 60.

It will be appreciated that the invention is not restricted to the particular embodiments that have been described, and that variations may be made therein without departing from the scope of the invention as defined in the appended claims and equivalents thereof. For example, although FIG. 2 illustrates the receiver 30 that is used for detecting return power in the test mode as a separate component from the receiver 104 that is used to detect a message provided by the router 8, a common receiver could be used in both the test mode and the control mode.

We claim:

1. A router having at least one router upstream port for receiving optical signal energy and a plurality of router downstream ports for emitting optical signal energy, said router comprising:

a signal energy division means for dividing the optical signal energy received by way of the router upstream port into a control portion and a utilization portion, an optical switch having a first switch port connected to receive the utilization portion of the optical signal energy and having a plurality of additional switch ports connected to the router downstream ports respectively, a decoder means for extracting a control message from the control portion of the optical signal energy, and a control means responsive to the control message for selectively setting the switch to interconnect the first switch port and a selected one of the additional switch ports, whereby at least part of the utilization portion of the optical signal energy received by the router by way of the router upstream port is emitted from the router by way of the router downstream port that is connected to the selected one of the additional switch ports.

2. A router according to claim 1, wherein the signal energy division means comprises an optical directional coupler having a first port connected to receive signal energy from the router upstream port, a second port connected to the first switch port for providing the utilization portion of the signal energy, and a third port connected to the decoder means for providing the control portion of the signal energy.

3. A router according to claim 2, wherein the decoder means comprises an optical receiver for generating an electrical signal that depends on intensity of the control portion of the signal energy and a processor for receiving the electrical signal and extracting the control message therefrom.

4. A router according to claim 2, wherein the decoder means comprises an optical detector for providing an electrical signal that depends on the power at which optical energy is received by the decoder means, a detector for detecting a modulation component of the electrical signal, and a processor for extracting the control message from the modulation component of the electrical signal.

5. A router according to claim 1, wherein the switch comprises a mechanical link member on which the first switch port is mounted and a motor coupled to the mechanical link member for moving the mechanical link member and thereby displacing the first switch port, and the control means is responsive to the control message for determining a desired position of the first switch port and providing an appropriate signal to the stepper motor.

6. A router according to claim 1, wherein the signal energy division means comprises a means for amplitude division of the optical signal energy received by way of the router upstream port.

7. A router according to claim 1, wherein the signal energy division means comprises a means for wavelength division of the optical signal energy received by way of the router upstream port.

8. A router having at least one router upstream port for receiving optical signal energy and a plurality of router downstream ports for emitting optical signal energy, said router comprising:

a signal energy division means for dividing the optical signal energy received by way of the router upstream port into a control portion and a utilization portion, an optical switch having a first switch port connected to receive the utilization portion of the optical signal energy and having a plurality of additional switch ports connected to the router downstream ports respectively, and an optical transceiver having an I/O port connected to the signal energy division means for receiving the control portion of the optical signal energy, the optical transceiver comprising a receiver responsive to the control portion of the optical signal energy for generating a control message, a control means responsive to the control message for selectively setting the switch to interconnect the first switch port and a selected one of the additional switch ports, whereby at least part of the utilization portion of the optical signal energy received by the router by way of the router upstream port is emitted from the router by way of the router downstream port that is connected to the selected one of the additional switch ports, and a transmitter responsive to a message generated by the control means for emitting optical energy by way of the I/O port.

9. A router according to claim 8, wherein the signal energy division means comprises a first optical directional coupler having a first port connected to receive signal energy from the router upstream port, a second port connected to the first switch port for providing the utilization portion of the signal energy, and a third port connected to the I/O port of the optical transceiver, and the optical transceiver comprises a second optical directional coupler having a first port connected to the third port of the first optical directional coupler, a second port connected to the optical receiver for delivering the control portion of the signal energy, and a third port to which the optical transmitter is connected.

10. A router according to claim 9, wherein the first optical directional coupler has a fourth port and the second optical directional coupler has a fourth port and the fourth port of the second directional coupler is connected to the fourth port of the first directional coupler.

11. A router according to claim 8, wherein the signal energy division means comprises and optical directional coupler having a first port connected to receive signal energy from the router upstream port and a second port connected to the first switch port for providing the utilization portion of the signal energy, and the optical directional coupler also has third and fourth ports connected to the I/O port of the optical transceiver.

12. A router according to claim 8, wherein the optical transmitter generates optical signal energy of intensity representative of an electrical signal provided by the control means.

13. A router having at least one router upstream port for receiving optical signal energy and a plurality of router downstream ports for emitting optical signal energy, said router comprising:

an optical directional coupler having a first port connected to the router upstream port and also having second, third, and fourth ports, the optical directional coupler dividing the optical signal energy received by way of the router upstream port into a utilization portion that is emitted by way of the second port and a control portion that is emitted by way of the third port, an optical switch having a first switch port connected to the second port of the directional coupler for receiving the utilization portion of the optical signal energy and having a plurality of additional switch ports connected to the router downstream ports respectively, a first optical transceiver having an I/O port connected to the third port of the optical directional coupler for receiving the control portion of the optical signal energy, the first optical transceiver comprising a receiver responsive to the control portion of the optical signal energy for generating a control message, a control means responsive to the control message for selectively setting the switch to interconnect the first switch port and a selected one of the additional switch ports, and a transmitter responsive to a message generated by the control means for emitting optical energy by way of the I/O port, and a second optical transceiver having an I/O port connected to the fourth port of the optical directional coupler for receiving optical energy from, and transmitting optical energy to, the selected one of the additional switch ports of the switch.

14. A router according to claim 13, wherein the second optical transceiver comprises a receiver responsive to received optical energy for generating a control message, and a transmitter responsive to a message generated by the control means for emitting optical energy by way of the I/O port of the second optical transceiver.

15. A router according to claim 14, wherein the receiver of the second optical transceiver is responsive to signal energy received from the selected one of the additional switch ports to provide a response message to the control means, and the control means is responsive to the signal message to drive the transmitter of the first optical transceiver to relay the response message to the router upstream port.

16. Test apparatus for stimulus/response testing of a plurality of devices, comprising:

a stimulus/response means for emitting signal energy in a predetermined form at an I/O port and receiving return energy in said predetermined form at the I/O port, said signal energy having a test signal component and a control signal component, and a router means having a router upstream port connected to the I/O port of the stimulus/response means for receiving signal energy in said predetermined form and also having a plurality of router downstream ports for connection to respective devices under test, said router means comprising a switch means having a first switch port connected to receive at least a portion of the test signal component of the signal energy received at the router upstream port and having additional switch ports connected to the router downstream ports respectively, a control signal decoding means responsive to the control signal component of the signal energy received at the router upstream port for extracting a control message, and a control means responsive to the control message for selectively setting the switch means to interconnect the first switch port and a selected one of the additional switch ports, whereby at least a portion of the test signal component of the signal energy received by the router means by way of the router upstream port is emitted from the router means by way of the router downstream port that is connected to the selected one of the additional switch ports.

17. Apparatus according to claim 16, wherein the router means comprises a means for dividing the signal energy received by way of the router upstream port into a control portion and a utilization portion and delivering the utilization portion to the switch means and the control portion to the control signal decoding means.

18. Apparatus according to claim 16, wherein the router means comprises at least a first level router and a second level router, each router having an upstream input port and a plurality of downstream ports, the upstream port of the second level router being coupled to a downstream port of the first level router and the downstream ports of the second level router being coupled to respective devices under test, and wherein the first level router comprises a first transceiver for receiving command messages from the stimulus/response means and transmitting response messages to the stimulus/response means, and a second transceiver for transmitting command messages to the second level router and receiving response messages from the second level router.

19. A control system for a router that has at least one router upstream port for receiving optical signal energy and a plurality of router downstream ports for emitting optical signal energy, the router comprising an optical switch having a first switch port for receiving optical signal energy from the router upstream port and also having a plurality of additional switch ports connected to the router downstream ports respectively, said control system comprising:

a signal energy division means for connection between the router upstream port and the first switch port, for receiving optical signal energy from the router upstream port, dividing the received signal energy into a utilization portion and a control portion, and directing the utilization portion to the first switch port,     a decoder means for extracting a control message from the control portion of the optical signal energy, and     a control means responsive to the control message for generating a switch control signal for selectively setting the switch to interconnect the first switch port and a selected one of the additional switch ports.

20. A control system according to claim 19, wherein the signal energy division means comprises an optical directional coupler having a first port for receiving signal energy from the router upstream port, a second port for connection to the first switch port for providing the utilization portion of the signal energy, and a third port connected to the decoder means for providing the control portion of the signal energy.

21. A control system according to claim 20, wherein the decoder means comprises an optical receiver for generating an electrical signal that depends on intensity of the control portion of the signal energy and a processor for receiving the electrical signal and extracting the control message therefrom.

22. A control system according to claim 20, wherein the decoder means comprises an optical detector for providing an electrical signal that depends on the power at which optical energy is received by the decoder means, a detector for detecting a modulation component of the electrical signal, and a processor for extracting the control message from the modulation component of the electrical signal.

23. A control system according to claim 19, wherein the signal energy division means comprises a means for amplitude division of the optical signal energy received by way of the router upstream port.

24. A control system according to claim 19, wherein the signal energy division means comprises a means for wavelength division of the optical signal energy received by way of the router upstream port.

25. A control system for a router that has at least one router upstream port for receiving optical signal energy and a plurality of router downstream ports for emitting optical signal energy, the router comprising an optical switch having a first switch port for receiving optical signal energy from the router upstream port and also having a plurality of additional switch ports connected to the router downstream ports respectively, said control system comprising:

a signal energy division means for connection between the router upstream port and the first switcher port, for receiving optical signal energy from the router upstream port and dividing the received signal energy into a control portion and a utilization portion and directing the utilization portion to the first switch port, and     an optical transceiver having an I/O port connected to the signal energy division means for receiving the control portion of the optical signal energy, the optical transceiver comprising a receiver responsive to the control portion of the optical signal energy for generating a control message, a control means responsive to the control message for generating a switch control signal for selectively setting the switch to interconnect the first switch port and a selected one of the additional switch ports, and a transmitter responsive to a message generated by the control means for emitting optical energy by way of the I/O port.

26. A control system according to claim 25, wherein the signal energy division means comprises a first optical directional coupler having a first port for connection to the router upstream port for receiving signal energy therefrom, a second port for connection to the first switch port for providing the utilization portion of the signal energy, and a third port connected to the I/O port of the optical transceiver, and the optical transceiver comprises a second optical directional coupler having a first port connected to the third port of the first optical directional coupler, a second port connected to the optical receiver for delivering the control portion of the signal energy, and a third port to which the optical transmitter is connected.

27. A control system according to claim 26, wherein the first optical directional coupler has a fourth port and the second optical directional coupler has a fourth port and the fourth port of the second directional coupler is connected to the fourth port of the first directional coupler.

28. A control system according to claim 25, wherein the signal energy division means comprises an optical directional coupler having a first port for connection to the router upstream port for receiving signal energy therefrom and a second port for connection to the first switch port for providing the utilization portion of the signal energy, and the optical directional coupler also has third and fourth ports connected to the I/O port of the optical transceiver.

29. A control system according to claim 25, wherein the optical transmitter generates optical signal energy of intensity representative of an electrical signal provided by the control means.

30. A control system for a router that has at least one router upstream port for receiving optical signal energy and a plurality of router downstream ports for emitting optical signal energy, the router comprising an optical switch having a first switch port for receiving optical signal energy and also having a plurality of additional switch ports connected to the router downstream ports respectively, said control system comprising:

an optical directional coupler having a first port for connection to the router upstream port and also having second, third, and fourth ports, the optical directional coupler dividing the optical signal energy received by way of its first port into a utilization portion that is emitted by way of the second port, for directing to the first switch port, and a control portion that is emitted by way of the third port,     a first optical transceiver having an I/O port connected to the third port of the optical directional coupler for receiving the control portion of the optical signal energy, the first optical transceiver comprising a receiver responsive to the control portion of the optical signal energy for generating a control message, a control means responsive to the control message for generating a switch control signal for selectively setting the switch to interconnect the first switch port and a selected one of the additional switch ports, and a transmitter responsive to a message generated by the control means for emitting optical energy by way of the I/O port, and a second optical transceiver having an I/O port connected to the fourth port of the optical directional coupler for receiving optical energy from, and transmitting optical energy to, the second port of the optical directional coupler.

31. A control system according to claim 30, wherein the second optical transceiver comprises a receiver responsive to received optical energy for generating a control message, and a transmitter responsive to a message generated by the control means for emitting optical energy by way of the I/O port of the second optical transceiver.

32. A control system according to claim 31, wherein the receiver of the second optical transceiver is responsive to signal energy received from the second port of the optical directional coupler to provide a response message to the control means and the control means is responsive to the signal message to drive the transmitter of the first optical transceiver to relay the response message to the first port of the optical directional coupler.

* * * * *